(12) United States Patent
Dierberger

(10) Patent No.: US 9,988,911 B2
(45) Date of Patent: Jun. 5, 2018

(54) GAS TURBINE ENGINE COMPONENT PAIRED FILM COOLING HOLES

(71) Applicant: United Technologies Corporation, Hartford, CT (US)

(72) Inventor: James A. Dierberger, Hebron, CT (US)

(73) Assignee: United Technologies Corporation, Farmington, CT (US)

(*) Notice: Subject to any disclaimer, the term of this patent is extended or adjusted under 35 U.S.C. 154(b) by 258 days.

(21) Appl. No.: 14/767,498

(22) PCT Filed: Feb. 5, 2014

(86) PCT No.: PCT/US2014/014916
§ 371 (c)(1),
(2) Date: Aug. 12, 2015

(87) PCT Pub. No.: WO2014/204523
PCT Pub. Date: Dec. 24, 2014

(65) Prior Publication Data
US 2016/0003054 A1 Jan. 7, 2016

Related U.S. Application Data

(60) Provisional application No. 61/769,515, filed on Feb. 26, 2013.

(51) Int. Cl.
*F02C 7/12* (2006.01)
*F01D 5/18* (2006.01)
(Continued)

(52) U.S. Cl.
CPC ............ *F01D 5/186* (2013.01); *F01D 9/041* (2013.01); *F01D 9/065* (2013.01); *F01D 11/08* (2013.01);
(Continued)

(58) Field of Classification Search
CPC .......... F01D 5/186; F01D 9/065; F01D 25/12; F01D 11/08; F23R 3/002; F23R 3/06;
(Continued)

(56) References Cited

U.S. PATENT DOCUMENTS 4,529,358 A * 7/1985 Papell .................... F01D 5/186
415/115
5,096,379 A * 3/1992 Stroud ................. B23K 26/388
29/889.721
(Continued)

FOREIGN PATENT DOCUMENTS

EP 0365195 4/1990
EP 0375175 6/1990
(Continued)

OTHER PUBLICATIONS

Extended European Search Report for European Application No. 14814171.6 dated Sep. 16, 2016.
(Continued)

*Primary Examiner* — Steven Sutherland
(74) *Attorney, Agent, or Firm* — Carlson, Gaskey & Olds, P.C.

(57) ABSTRACT

A gas turbine engine component includes a wall that provides exterior and interior surfaces. The interior surface faces an internal cooling passage of the gas turbine engine component. An aperture extends through the wall and interconnects the interior and exterior surfaces to one another and is configured to provide a cooling fluid from the cooling passage to the exterior surface. The aperture has first and second outlet holes overlapping one another at an intersection to provide opposing sharp corners at the intersection.

6 Claims, 3 Drawing Sheets

(51) Int. Cl.
| | |
|---|---|
| *F01D 9/04* | (2006.01) |
| *F01D 11/08* | (2006.01) |
| *F01D 25/12* | (2006.01) |
| *F01D 25/28* | (2006.01) |
| *F01D 25/30* | (2006.01) |
| *F23R 3/06* | (2006.01) |
| *F01D 9/06* | (2006.01) |
| *F23R 3/00* | (2006.01) |

(52) U.S. Cl.
CPC ............. *F01D 25/12* (2013.01); *F01D 25/28* (2013.01); *F01D 25/30* (2013.01); *F23R 3/002* (2013.01); *F23R 3/06* (2013.01); *F05D 2220/32* (2013.01); *F05D 2230/13* (2013.01); *F05D 2230/14* (2013.01); *F05D 2240/11* (2013.01); *F05D 2240/80* (2013.01); *F05D 2240/81* (2013.01); *F05D 2260/202* (2013.01); *F23R 2900/03042* (2013.01); *Y02T 50/676* (2013.01)

(58) Field of Classification Search
CPC .... F02C 7/12; F05D 2240/81; F05D 2240/11; F05D 2260/202
USPC .................... 415/115, 173.1; 416/96 R, 97 R
See application file for complete search history.

(56) References Cited

U.S. PATENT DOCUMENTS

| | | | |
|---|---|---|---|
| 5,263,820 A | 11/1993 | Tubbs | |
| 5,326,224 A | 7/1994 | Lee et al. | |
| 5,577,381 A * | 11/1996 | Eigenbrode | F02K 1/36 239/127.3 |
| 7,597,540 B1 | 10/2009 | Liang | |
| 7,682,132 B2 | 3/2010 | Sugimoto et al. | |
| 2007/0109743 A1 | 5/2007 | Sugimoto et al. | |
| 2008/0124214 A1* | 5/2008 | Lutjen | F01D 11/08 415/173.1 |
| 2009/0196737 A1 | 8/2009 | Mitchell | |
| 2009/0304494 A1 | 12/2009 | Strock et al. | |
| 2010/0068032 A1 | 3/2010 | Liang | |
| 2010/0229564 A1* | 9/2010 | Chila | F23R 3/06 60/752 |
| 2010/0329846 A1 | 12/2010 | Ramachandran et al. | |
| 2011/0293423 A1 | 12/2011 | Bunker et al. | |

FOREIGN PATENT DOCUMENTS

| | | |
|---|---|---|
| EP | 0666406 | 8/1995 |
| EP | 2131108 | 12/2009 |

OTHER PUBLICATIONS

International Preliminary Report on Patentability for PCT Application No. PCT/US2014/014916, dated Sep. 11, 2015.
International Search Report for PCT/US2014/014916 completed on Jan. 9, 2015.
Numerical Study on Film-Cooling Effectiveness for Various Film-Cooling Hole Schemes Sun-min Kim, Ki-Don Lee and Kwang-Yong Kim Dept. of Mechanical Engineering Inha University Incheon, Republic of Korea. Proceedings of the ASME-JSME-KSME 2011 Joint Fluids Engineering Conference AJK-Fluids2011 Jul. 24-29, 2011, Hamamatsu, Shizuoka, Japan. pp. 1-7.

* cited by examiner

GAS TURBINE ENGINE COMPONENT PAIRED FILM COOLING HOLES

BACKGROUND

This disclosure relates to a gas turbine engine component, such as an airfoil. More particularly, the disclosure relates to a configuration of cooling holes.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Gas path temperatures are well above the melting point of hot section components, necessitating cooling component for adequate durability. Many blades and vanes, blade outer air seals, turbine platforms, and other components include internal cooling passages. Some of the cooling passages may communicate cooling flow from the cooling passage through cooling holes to an exterior surface.

The film cooling holes may be formed according to a wide variety of configurations, such as slots, cylindrical holes and holes of shaped geometries. One configuration utilizes a dumbbell or dog bone shaped hole in which the intersection of the holes is enlarged to widen and smooth the aperture at the intersection of the holes. Another example hole configuration utilizes intersecting holes in which one side of the intersection is enlarged to provide a flat surface that is tangential to each of the holes. Both of these hole configurations are rather complicated to form and may be beyond the practical or economical limits of widely used cooling hole forming techniques.

SUMMARY

In one exemplary embodiment, a gas turbine engine component includes a wall that provides exterior and interior surfaces. The interior surface faces an internal cooling passage of the gas turbine engine component. An aperture extends through the wall and interconnects the interior and exterior surfaces to one another and is configured to provide a cooling fluid from the cooling passage to the exterior surface. The aperture has first and second outlet holes overlapping one another at an intersection to provide opposing sharp corners at the intersection.

In a further embodiment of the above, the gas turbine engine component is an airfoil.

In a further embodiment of any of the above, the gas turbine engine component is a blade outer air seal.

In a further embodiment of any of the above, the gas turbine engine component is a combustor liner.

In a further embodiment of any of the above, the gas turbine engine component is an exhaust liner.

In a further embodiment of any of the above, the gas turbine engine component is a platform.

In a further embodiment of any of the above, the first and second outlet holes respectively include first and second diameters that are equal to one another.

In a further embodiment of any of the above, the first and second outlet holes respectively include first and second diameters that are unequal to one another.

In a further embodiment of any of the above, the aperture includes a third outlet hole that intersects the first outlet hole.

In a further embodiment of any of the above, the aperture includes a common inlet hole.

In a further embodiment of any of the above, the aperture includes a first and second inlet holes that overlap one another at an intersection.

In another exemplary embodiment, a gas turbine engine component includes a wall that provides exterior and interior surfaces. The interior surface faces an internal cooling passage of the gas turbine engine component. An aperture extends through the wall and interconnects the interior and exterior surfaces to one another and is configured to provide a cooling fluid from the cooling passage to the exterior surface. The aperture has first and second outlet holes that respectively include first and second diameters that are unequal to one another.

In a further embodiment of any of the above, the aperture includes a third outlet hole that intersects the first outlet hole.

In another exemplary embodiment, a method of manufacturing a film cooling aperture in a gas turbine engine component includes machining a first cooling hole from an exterior surface to an interior surface that communicates with an internal cooling passage of the gas turbine engine component. The method also includes machining a second cooling hole that overlaps the first cooling hole at an intersection to provide opposing sharp corners.

In a further embodiment of any of the above, the machining is performed by laser machining.

In a further embodiment of any of the above, the machining is performed by electro discharge machining.

In a further embodiment of any of the above, the machining is provided by drilling.

In a further embodiment of any of the above, no machining is performed subsequent to the first and second cooling hole machining steps.

BRIEF DESCRIPTION OF THE DRAWINGS

The disclosure can be further understood by reference to the following detailed description when considered in connection with the accompanying drawings wherein.

DETAILED DESCRIPTION

Figure 1:
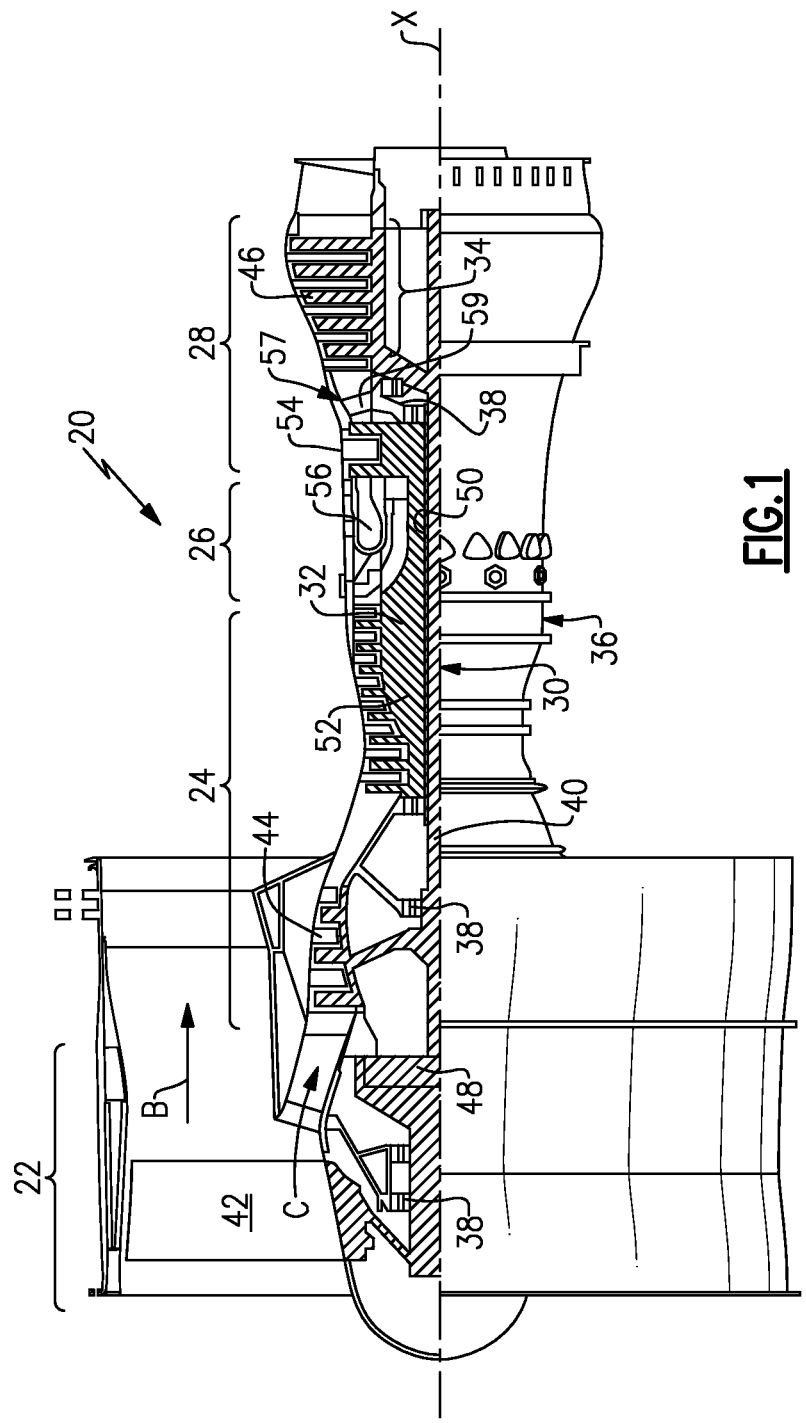
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

Figure 2A:
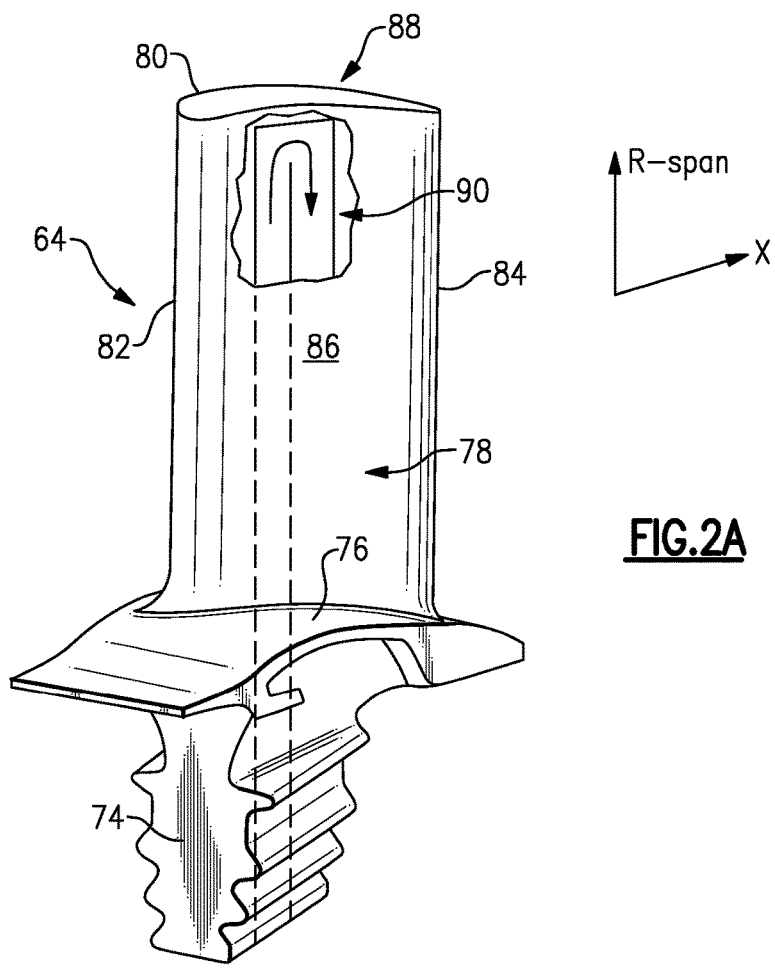
FIG. 2A is a perspective view of the airfoil having the disclosed cooling passage.
Figure 2B:
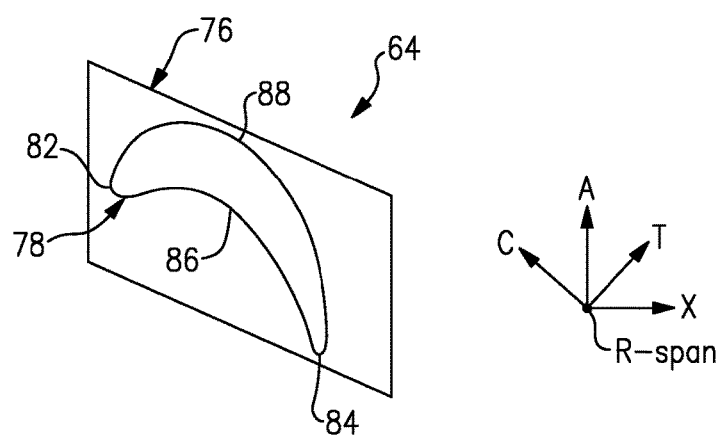
FIG. 2B is a plan view of the airfoil illustrating directional references.

The disclosed cooling passage may be used in various gas turbine engine components. For exemplary purposes, a turbine blade 64 is described. Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Figure 3:
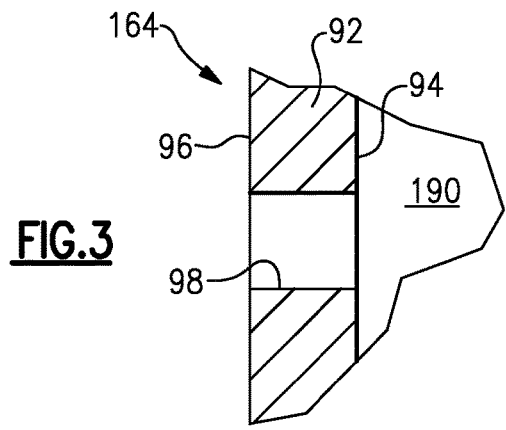
FIG. 3 is a cross-sectional view through a component having an aperture that provides film cooling.

In one example, a gas turbine engine component 164 is illustrated in FIG. 3. The component 164 may be any number of gas turbine engine components, such as an airfoil, a blade outer air seal, a combustor liner, an exhaust liner, a heat shield and/or a platform, for example. A cooling passage 190 is provided within the component 164. The component 164 includes a wall 92 having an exterior surface 96 and an interior surface 94 facing the cooling passage 190. An aperture 96 extends through the wall 92 to fluidly connect the interior surface 94 to the exterior surface 96 to provide cooling fluid from the cooling passage 190 to the exterior surface 96.

Figure 4A:
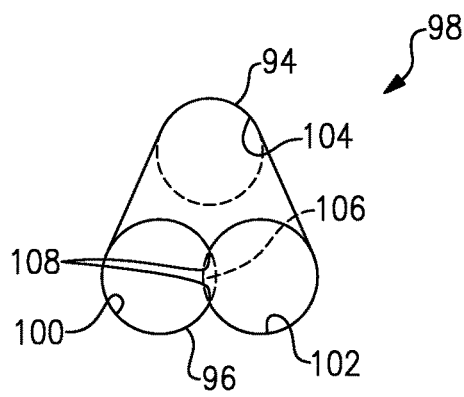
FIG. 4A is a schematic view of paired outlet holes having a common inlet hole.

In one example, aperture 98 is illustrated in FIG. 4A. The aperture 98 includes first and second outlet holes 100, 102 provided in the exterior surface 96. The first and second outlet holes 100, 102 overlap one another at an intersection 106. The centerlines of the outlet holes 100, 102 converge with one another and are joined to one another at a common inlet hole 104 provided on the interior surface 94. Unlike prior art paired cooling holes, the first and second outlet holes 100, 102 provide sharp corners or points 108. That is, the intersection 106 of the first and second outer holes 100, 102 is not enlarged subsequent to machining the first and second outer holes 100, 102.

Figure 4B:
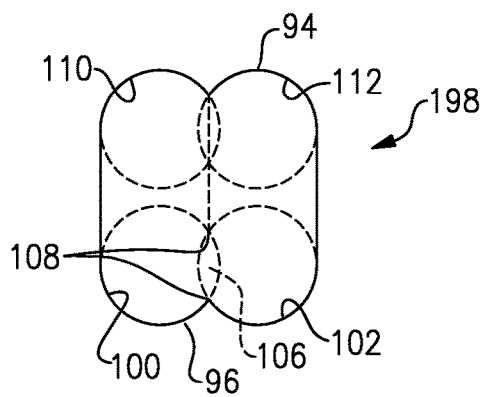
FIG. 4B is a schematic view of paired outlet holes having paired inlet holes.

Referring to FIG. 4B, the first and second outer holes 100, 102 are similar to those illustrated in FIG. 4A. Rather than sharing a common inlet hole, as shown in FIG. 4A, the aperture 198 includes first and second inlet holes 110, 112 have parallel centerlines such that the inlet holes overlap one another at the inner surface 94.

The example apertures 98, 198 illustrated in FIGS. 4A and 4B are provided with holes having the same size. The example apertures 298, 398 of FIGS. 5A and 5B utilize outlet holes having different sizes. Overlapping holes of different sizes causes the cooling fluid to expand at different angles with respect to the exterior surface 96. For example, in an arrangement in which a second cooling hole is half the diameter of the first cooling hole, the cooling fluid at one given flow rate may expand from the larger hole at an angle of eighteen degrees relative to the exterior surface 96 while the cooling fluid from the smaller diameter hole may expand at twenty-seven degrees relative to the exterior surface. This difference in cooling fluid expansion enables the apertures 298, 398 to be oriented to provide different cooling fluid expansion at different locations of the component, as desired.

Figure 5:
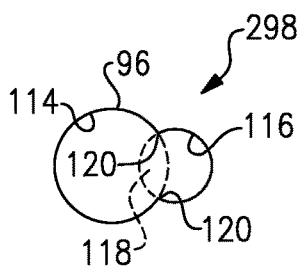
FIG. 5 illustrates paired outlet holes in which one hole is larger than the other hole.

In the example shown in FIG. 5, first and second outlet holes 114, 116 overlap one another at an intersection 118 to provide opposing sharp corners 120. In the example, the first and second outlet holes 114, 116 are of different sizes, for example, the second outlet hole 116 is half the diameter of the first outlet hole 114.

Figure 6:
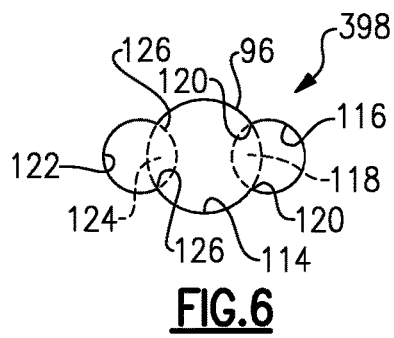
FIG. 6 illustrates multiple intersecting holes in which at least some of the holes have different sizes.

Referring to FIG. 6, in addition to the first and second outlet holes 114, 116 shown in FIG. 5, a third outlet hole 122 overlaps the first outlet hole 114 at an intersection 124 providing sharp corners 126 opposite one another. In another exemplary embodiments, more than three intersecting holes may be used to provide the aperture.

The cooling holes are machined into the component, for example, by drilling, laser machining, and/or electro discharge machining that produce generally circular holes. The cooling hole configuration is achieved by machining generally circular holes that overlap one another at an intersection. Subsequent machining or smoothing adjacent to the intersection is not needed, such that opposing sharp corners remain at the intersection where the generally circular cooling holes overlap.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine component comprising:
a wall providing exterior and interior surfaces, the interior surface facing a cooling passage internal to the gas turbine engine component, an aperture extending through the wall and interconnecting the interior and exterior surfaces to one another and configured to provide a cooling fluid from the cooling passage to the exterior surface, the aperture provided by only first and second outlet holes overlapping one another at a first intersection to provide opposing first sharp corners at the first intersection, the first and second outlet holes respectively extending to first and second inlet holes at the interior surface, the first and second inlet holes overlapping one another at a second intersection to provide second sharp corners at the second intersection, the first and second outlet holes each include a centerline, the centerlines parallel to one another.

2. The gas turbine engine component according to claim 1, wherein the gas turbine engine component is an airfoil.

3. The gas turbine engine component according to claim 1, wherein the gas turbine engine component is a blade outer air seal.

4. The gas turbine engine component according to claim 1, wherein the gas turbine engine component is a combustor liner.

5. The gas turbine engine component according to claim 1, wherein the gas turbine engine component is an exhaust liner.

6. The gas turbine engine component according to claim 1, wherein the gas turbine engine component is a platform.

* * * * *